(12) United States Patent
Wimberly

(10) Patent No.: US 8,919,994 B2
(45) Date of Patent: Dec. 30, 2014

(54) ILLUMINATION SYSTEM AND LAMP UTILIZING DIRECTIONALIZED LEDS

(71) Applicant: Randal L. Wimberly, Elizabethtown, IL (US)

(72) Inventor: Randal L. Wimberly, Elizabethtown, IL (US)

( * ) Notice: Subject to any disclaimer, the term of this patent is extended or adjusted under 35 U.S.C. 154(b) by 0 days.

(21) Appl. No.: 13/694,561

(22) Filed: Dec. 12, 2012

(65) Prior Publication Data

US 2014/0160744 A1     Jun. 12, 2014

(51) Int. Cl.
| | |
|---|---|
| B60Q 1/26 | (2006.01) |
| F21V 7/00 | (2006.01) |
| F21V 13/04 | (2006.01) |
| F21V 14/02 | (2006.01) |
| F21V 29/00 | (2006.01) |
| F21V 7/06 | (2006.01) |
| F21V 7/08 | (2006.01) |

(52) U.S. Cl.
CPC . *F21V 7/00* (2013.01); *F21V 13/04* (2013.01); *F21V 14/02* (2013.01); *F21V 29/22* (2013.01); *F21V 7/06* (2013.01); *F21V 7/08* (2013.01)
USPC ........... 362/232; 362/545; 362/487; 362/248; 362/656; 362/492; 362/247; 362/294; 362/650

(58) Field of Classification Search
CPC ...... F21Y 2010/21; F21K 9/00; F21V 29/004
USPC ......... 362/232, 545, 487, 248, 656, 492, 247, 362/294, 650
See application file for complete search history.

(56) References Cited

U.S. PATENT DOCUMENTS

| | | | |
|---|---|---|---|
| 5,688,042 A | 11/1997 | Madadi et al. | |
| 6,682,211 B2* | 1/2004 | English et al. | 362/545 |
| 6,715,900 B2* | 4/2004 | Zhang | 362/294 |
| 6,773,138 B2* | 8/2004 | Coushaine | 362/656 |
| 6,796,698 B2 | 9/2004 | Sommers et al. | |
| 6,957,906 B2 | 10/2005 | Coushaine et al. | |
| 7,048,412 B2* | 5/2006 | Martin et al. | 362/247 |
| 7,158,019 B2 | 1/2007 | Smith | |
| 7,296,913 B2 | 11/2007 | Catalano et al. | |
| 7,306,352 B2* | 12/2007 | Sokolov et al. | 362/341 |
| 7,563,005 B2* | 7/2009 | Yatsuda et al. | 362/373 |
| 7,683,772 B2 | 3/2010 | Smith | |
| 7,748,879 B2* | 7/2010 | Koike et al. | 362/487 |
| 7,784,969 B2 | 8/2010 | Reisenauer et al. | |
| 7,784,971 B2* | 8/2010 | Dorogi | 362/294 |
| 7,922,356 B2 | 4/2011 | Maxik et al. | |
| 7,964,883 B2 | 6/2011 | Mazzochette et al. | |
| 7,976,211 B2* | 7/2011 | Cao | 362/650 |
| 8,157,417 B2 | 4/2012 | Chen | |

(Continued)

*Primary Examiner* — Thomas A Hollweg

(57) ABSTRACT

An LED lamp specially adapted for use in combination with a concave reflector and to replace the incandescent light sources normally used. The lamp includes two or more light emitting diodes or light emitting diode arrays, each with a specified angle of light radiation, mounted substantially perpendicular to the lamp support and spaced symmetrically around the longitudinal axis of the said lamp support to form a compact consolidated light radiation area with a specified length, width, and height. All of the light radiates outward in a 360 degree radial pattern around and horizontal to the longitudinal axis of the said lamp support and at a specified angle of radiation vertical to the longitudinal axis of the said lamp support. Substantially all of the light emitted impinges on, and is redirected by, the reflector to project a high intensity beam of light with all light rays radiating at the same angle.

1 Claim, 8 Drawing Sheets

(56) References Cited

U.S. PATENT DOCUMENTS

| | | | |
|---|---|---|---|
| 8,206,009 B2* | 6/2012 | Tickner et al. | 362/294 |
| 8,569,785 B2* | 10/2013 | Cao | 257/99 |
| 2003/0063476 A1* | 4/2003 | English et al. | 362/545 |
| 2003/0103348 A1* | 6/2003 | Hung | 362/247 |
| 2003/0214810 A1* | 11/2003 | Zhang | 362/294 |
| 2003/0227774 A1* | 12/2003 | Martin et al. | 362/240 |
| 2004/0223338 A1* | 11/2004 | Koike et al. | 362/545 |
| 2006/0146533 A1* | 7/2006 | Chen et al. | 362/248 |
| 2008/0137345 A1* | 6/2008 | Wimberly | 362/299 |
| 2008/0291663 A1* | 11/2008 | Wedell et al. | 362/147 |
| 2009/0267519 A1* | 10/2009 | Pearse | 315/117 |
| 2013/0094199 A1* | 4/2013 | Lin et al. | 362/218 |

* cited by examiner

Fresnel Flood

Fresnel Spot

Par

Ellipsoidal

ILLUMINATION SYSTEM AND LAMP UTILIZING DIRECTIONALIZED LEDS

BACKGROUND OF THE INVENTION

This invention relates generally to incandescent illumination systems or fixtures and, more particularly, to light sources adapted for use in combination with a concave reflector in collecting a high proportion of the emitted light and projecting a high-intensity beam with a smooth and even beam pattern.

Lamps of this particular kind are useful in theater, television, architectural, and general purpose lighting fixtures that provide high-intensity beams of light. In such fixtures, it is desirable to collect as high a percentage of the emitted light as possible and to redirect that collected light as a high-intensity beam having a desired intensity distribution. Lamp manufacturers make lamps that can easily and interchangeably be used in these reflector systems and fixtures.

Incandescent lamps of this kind commonly are used in combination with ellipsoid or near-ellipsoidal reflectors. The lamps are positioned with their light-emitting filaments located at or near a general focal point close to the reflector, such that emitted light impinging on the reflector is redirected through a gate to a lens that then projects the high-intensity beam.

Alternatively, such lamps can be used in combination with parabolic or near-parabolic reflectors. The lamp is positioned with its filaments at or near the reflector's general focal point such that emitted light impinging on the reflector is redirected to form the projected beam without the need for a lens. However, a lens sometimes is used to alter the projected beam's divergence or spread or to integrate the beam and thereby provide a desired intensity distribution.

Incandescent lamps used in illumination systems of this kind typically have included a filament having a longitudinal axis. The filament radiates light in all directions and typically is oriented with its longitudinal axis parallel to, or perpendicular to, the longitudinal axis of the lamp and reflector.

It is known that there is a single point in a reflector that is the most efficient point to place the light source and that point is known as the focal point. In theory this point should be a point source or infinitely small point. Cunningham U.S. Pat. No. 5,268,613, and McBride Jr., et al. U.S. Pat. No. 6,034,473 disclosed the need to compact the light source in an effort to make it more efficient.

The incandescent lamps described briefly above have proven to be generally satisfactory for use in combination with concave reflectors in providing high-intensity beams of light. However, it is known that some of the emitted light does not combine with the high intensity beam of light in a positive manner. Systems using a parabolic or an ellipsoidal reflector, as depicted in FIG. 8C and FIG. 8D respectively, also produce a cone of light rays, originating from the light source, and passing unreflected through the front of the reflector; the angle of this cone of rays being determined and defined by the front rim of the reflector. The more widely divergent light rays 17 of the cone of rays, that is, the rays passing relatively nearer to the rim of the reflector, have such a large sideways component of direction so as to fall outside of the desired light pattern or gate and therefore are wasted. Furthermore, the angle of light rays radiating from this cone of rays 16, different than that of the rays reflected by the parabolic reflector or that of the ellipsoidal reflector, causes problems when coupling this combined field of light rays into a lens to project an image or a beam of light toward a distant location.

These incandescent projector lamps are also used in Fresnel lighting fixtures. The Fresnel systems are the most efficient type of light projection system and has very little light loss 17 when used in the flood position, as depicted in FIG. 8A, to produce a desired light beam 11. These systems use a spherical reflector to reflect light back through the incandescent light source and through a fresnel lens mounted at a variable distance from the said reflector and light source to produce a beam of light with a variable angle of radiation 11. This system has the advantage of not producing rays of light with conflicting angles of radiation but has a great deal of light loss 17 when the fixture is in the spot position, as depicted in FIG. 8B, where the fresnel lens is further away from the reflector and lamp.

Light emitting diodes have become popular because of their efficiency but they do not produce high output levels individually, therefore multiple LEDs must be used to produce lighting devices that are useful. This has created the need for lighting fixture designers to make new complicated designs allowing the use of multiple light sources, complex optics systems, electronic circuits to power these sources and means for cooling those light sources. These facts are some of the reasons LEDs have not been adapted as direct replacements for common high output projection lighting fixtures.

It should, therefore, be appreciated that there is a need for a replacement lamp utilizing the means to use the improved, more efficient semiconductor light sources to replace the standard incandescent projector lamp for use with a concave reflector. Also, the means to cool the said lamp and an easy way to replace some of the individual parts that make up this new type of light source. Additionally, a method to compact the light source and an improved means to allow more of the light generated to impinge on the reflector and project a controlled high-intensity beam of light with a higher collection efficiency, a smooth field of illumination with all rays of white light or colored light evenly mixed together and radiating at substantially the same angle, and easiest possible method of manufacture. The present invention fulfills this need.

BRIEF SUMMARY OF THE INVENTION

The present invention is embodied in an LED lamp specially adapted for use in combination with a concave reflector in providing a high-intensity beam of light. The lamp includes two or more light emitting diodes or light emitting diode arrays, each with a specified angle of light radiation directionalized outward perpendicular to and spaced substantially symmetrically around, the longitudinal axis of the concave reflector to create a compact light radiation area with a specified length (L), width (W), and height (H), oriented with the height parallel to the longitudinal axis of the said lamp. This configuration closely emulates the size and positioning of a standard incandescent lamp filament wherein the light radiates outward in a 360 degree radial pattern around and horizontal to the longitudinal axis of the lamp, with the added advantage of projecting light only at a specified angle of radiation vertical to the longitudinal axis of the said lamp wherein a substantial portion of the light emitted by the lamp impinges on, and is redirected by, the reflector to project a high intensity beam of light with all light rays radiating at the same angle. Additionally the lamp may include parts made of a material and in a shape that dissipates heat, an electronic circuit to power the LEDs, and a simple method to replace the said circuit and any LEDs that may become defective over time used. Also, the color spectrum and color temperature of the said high intensity beam of light can be changed electronically by using light emitting diodes producing light of a different color spectrum and providing each group of colors with access to a different power supply that can be turned on or adjusted separately.

Other features and advantages of the present invention should become apparent from the following descriptions of the preferred embodiments, taken in conjunction with the accompanying drawings, which illustrate, by way of example, the principles of the invention.

DESCRIPTION OF THE PREFERRED EMBODIMENTS

Figure 1:
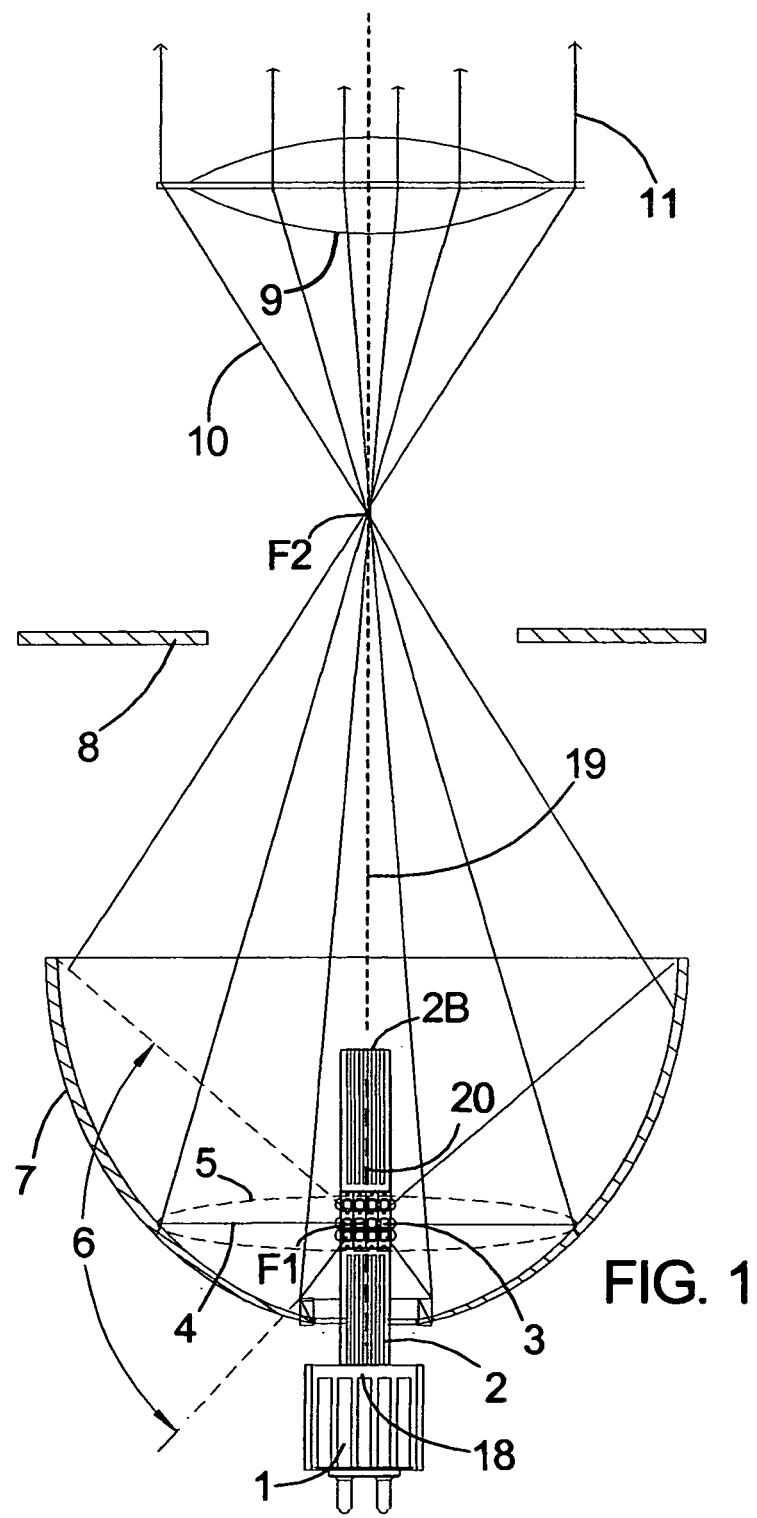
FIG. 1 is a schematic diagram of a first embodiment of an illumination system or fixture in accordance with the invention, this system including a lamp utilizing forty eight directionalized LEDs, a near-ellipsoidal reflector, a gate, and a collimating lens.

With reference now to the drawings, and particularly to FIG. 1, there is shown schematically a light projection system for providing a high-intensity collimated beam of light 11. The system includes an LED lamp 18, a concave reflector 7, an aperture stop or gate 8, and a lens 9. The reflector is generally ellipsoidal in shape, with a central longitudinal axis 19 and with a focal point or focal region $F_1$ that it encircles. The LED lamp includes a base 1 having means for securing it to a part of the reflector, and a lamp support section aligned with the reflector's longitudinal axis and with the lamp's light emitting diodes 3 being positioned close to the reflector's focal point. A substantial portion of light emitted by the light emitting diodes 3 projects outward 4 in a 360 degree radial pattern 5 around and horizontal to the reflector's longitudinal axis 19 and at a specified angle of radiation 6 vertical to the said reflector's longitudinal axis 19, to impinge on the reflector 7 and be redirected generally forwardly through the gate 8 to the lens 9. The forward facing part of the lamp support section may be extended and configured as a heat sink cooling device 2B because there are no light emitting diodes mounted to the end of the lamp support section facing forwardly. The lens 9 is positioned with its focal point approximately at the gate 8 such that the projected beam 11 has an intensity distribution corresponding generally with the intensity distribution at the gate 8.

The LED lamp 18 is preferably positioned relative to the reflector 7 with its light emitting diodes 3 as close to the reflector's general focal point F1 as possible. To the extent that the light emitting diodes 3 are spaced away from that focal point F1, the light reflected by the reflector 7 is more likely not to pass through the aperture of the gate 8 or otherwise is more likely to miss the lens 9 and thereby not be incorporated into the projected beam 11. Additionally, to the extent that the light emitting diode's specified angle of radiation 6 is less than 160 degrees, the light reflected by the reflector 7 is more likely to pass through the aperture of the gate 8, pass through the lens 9, and thereby be incorporated into the projected beam 11. Although the reflector 7 is generally circumferentially symmetrical, its reflective surface is locally irregular, to better integrate the reflected light and thereby provide the projected beam with a more circumferentially-uniform intensity distribution. In addition, the reflector's general shape is preferably adjusted to provide a substantial cosine distribution of light passing through the gate aperture.

In the past, incandescent lamps for this type of light projection system generated light in all directions. Generally, an unduly high proportion of the light emitted by prior lamps was misdirected so as not to be included in the projected beam.

In the LED lamp 18 of the invention, a greater proportion of emitted light is collected into the projected beam 11 by providing the lamp 18 with four groups of twelve light emitting diodes 3 each mounted to one side of the lamp support section, for a total of forty eight light emitting diodes 3 with a specified angle of light radiation 6 directionalized outward 4 perpendicular to and spaced substantially symmetrically around, the longitudinal axis of the concave reflector 19. By this arrangement, a greater proportion of the total emitted light impinges on, and is redirected by, the reflector 7 converging at the second focal point F2 and radiating at substantially the same angle 10 to pass through the lens 9 and project a high intensity beam of light 11 with all light rays radiating at substantially the same generally parallel angle.

Figure 2:
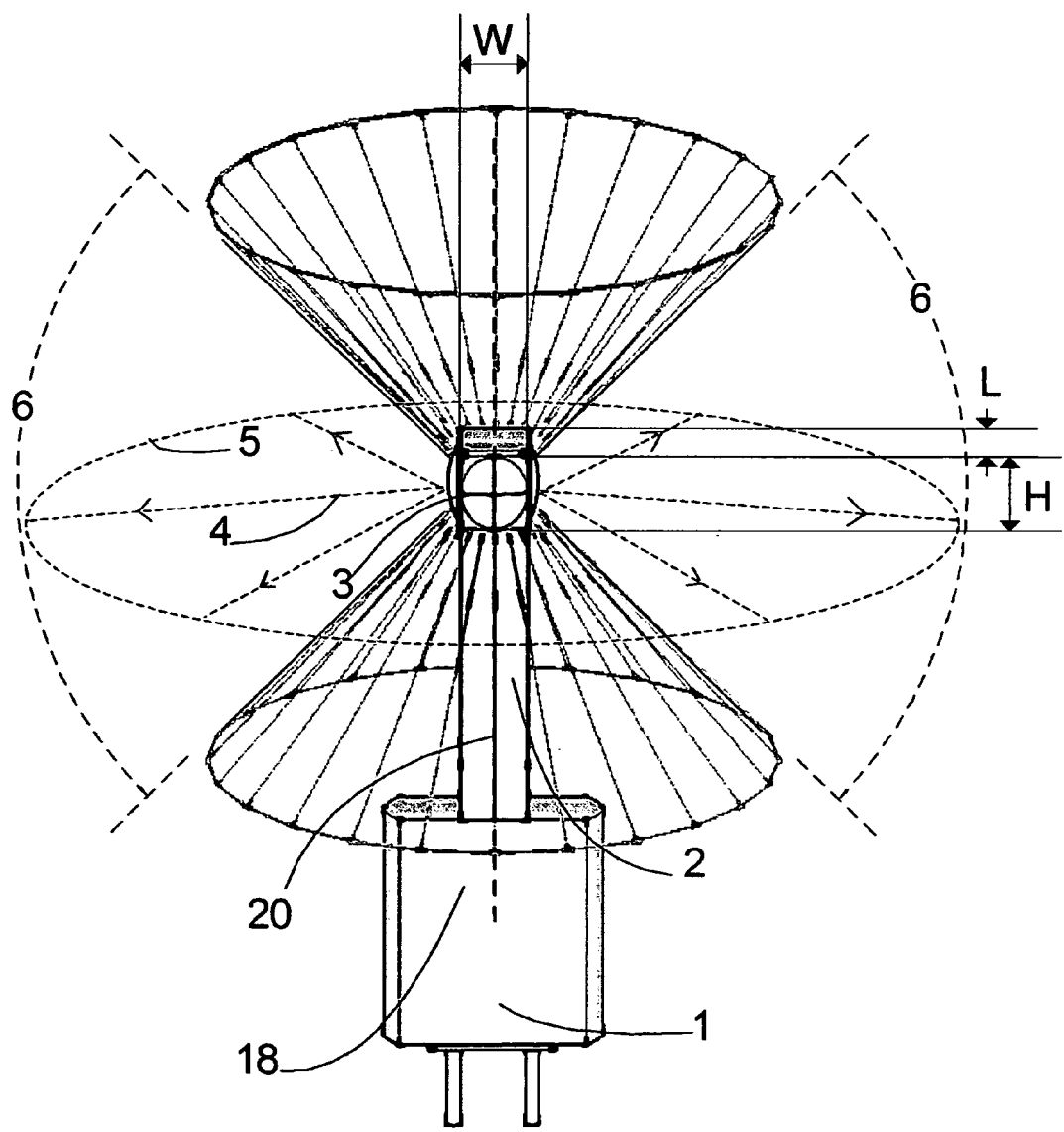
FIG. 2 is a schematic diagram of a dimensional front view of a first embodiment of an LED lamp in accordance with the invention, this lamp utilizing directionalized LEDs with a specified angle of light radiation to create a compact light radiation area.

With reference now to FIG. 2, there is shown a front view, with perspective, of a first embodiment of an LED lamp 18 constructed in accordance with the invention. In addition to the standard lamp base 1, the lamp further includes a lamp support 2 in the shape of a polygon with a central longitudinal axis 20 and a square cross section. The lamp also includes four light emitting diode arrays 3, each with a specified angle of light radiation 6, and one each of the said light emitting diode arrays 3 mounted substantially perpendicular to the lamp support and spaced symmetrically around the longitudinal axis of the said lamp support to form a compact light radiation area with a specified length (L), width (W), and height (H), oriented with the height parallel to the longitudinal axis 20 of the said lamp 18. This configuration closely emulates the size and positioning of a standard incandescent lamp filament wherein the light radiates outward 4 in a 360 degree radial pattern 5 around and horizontal to the longitudinal axis of the lamp but, with the added advantage of projecting light only at a specified angle of radiation 6 vertical to the longitudinal axis 20 of the said lamp 18. In use, the lamp is advantageously used with its central longitudinal axis 20 aligned with the longitudinal axis 19 of a concave reflector 7.

Because of the lamps' specialized geometry and the specified angle of radiation 6 less than 160 degrees, substantially all of the light radiating from the light emitting diodes is directed toward the concave reflector 7 thereby greatly increasing the efficiency of any illumination system using this LED lamp 18.

Figure 3:
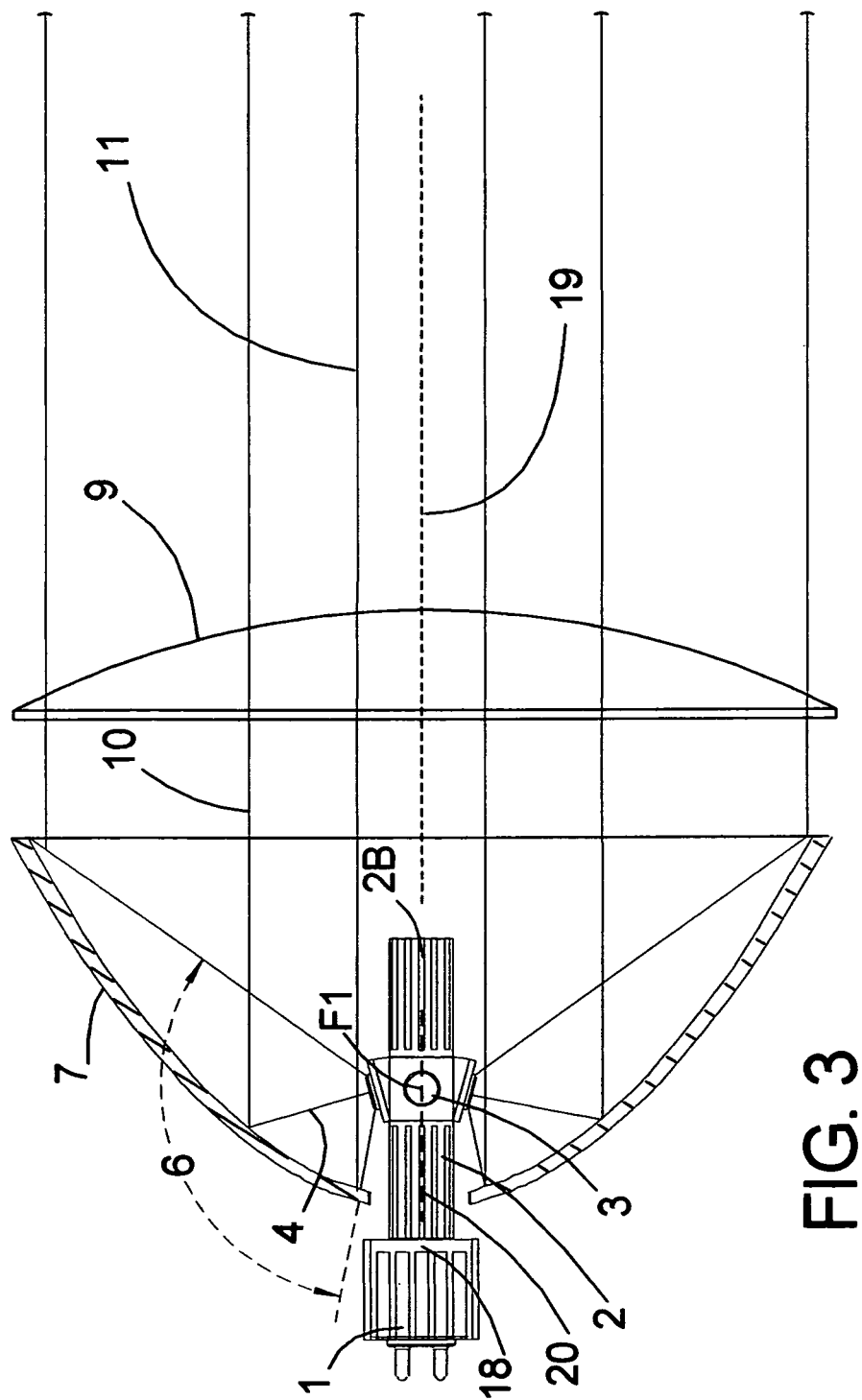
FIG. 3 is a schematic diagram of an alternate embodiment of an illumination system or fixture in accordance with the invention, this system including a lamp utilizing four directionalized LED arrays, a near-parabolic reflector, and an optional lens.

With reference now to the drawings, and particularly to FIG. 3, there is shown schematically an improved illumination system in accordance with the invention including a reflector 7 in the form of a near parabola, an LED lamp 18 positioned with its' light radiation area (L, W, and H) within the "focal region" near the reflector's focal point F1, and an optional lens 9 to alter the beam's divergence or spread or to integrate the beam and thereby provide a desired intensity distribution.

In addition to the standard lamp base 1, the lamp also includes a lamp support 2 in the shape of a polygon with a central longitudinal axis 20 and a substantially square cross section. The LED lamp further includes four light emitting diode arrays 3 wherein one each of the said light emitting diode arrays 3 is mounted substantially perpendicular 4 to the lamp support and spaced symmetrically around the longitudinal axis 20 of the said lamp support with the specified angle of radiation 6 directionalized, slightly downward toward the lamp base 2, to cooperate more efficiently with the concave parabolic reflector 7 allowing more of the light projecting outward 4 in a 360 degree radial pattern 5 around and horizontal to the reflector's longitudinal axis 19 and at a specified angle of radiation 6 vertical to the said reflector's longitudinal axis 19, to impinge on the said reflector 7. The forward facing part of the lamp support section may be extended forwardly and configured as a heat sink cooling device 2B because there are no light emitting diodes mounted to the end of the lamp support section 2B facing forwardly.

Because of the nature of a parabola, emitted light 4 impinging on the reflector 7 is redirected along an axis substantially parallel with the reflector's longitudinal axis 19. A beam 11 thereby is projected without the need for a gate or collimating lens.

Figure 4:
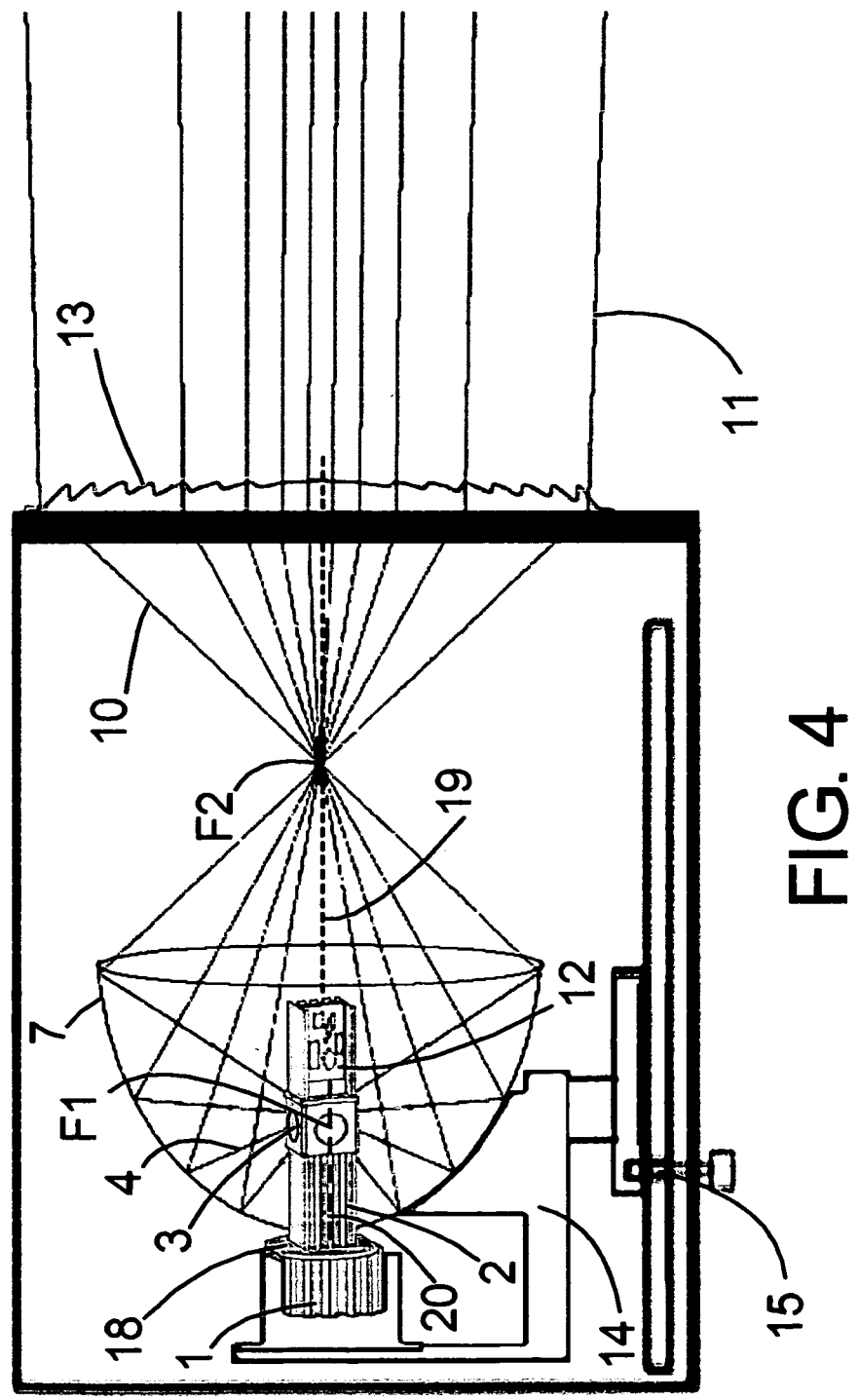
FIG. 4 is a schematic diagram of an alternate embodiment of an illumination system or fixture in accordance with the invention, including a fresnel lens arranged at a variable distance from a reflector and an LED lamp mounted as an optical unit movable along an optical axis.

With reference now to the drawings, and particularly to FIG. 4, there is shown schematically in accordance with the invention an illumination system with an adjustable angle of light projection including a fresnel lens 13 arranged at a variable distance from a concave reflector 7 and an LED lamp 18, wherein the said reflector 7 and LED lamp 18 are mounted as an optical unit 14 that is movable along an optical axis 19 relative to the said fresnel lens 13. The reflector 7 is generally ellipsoidal in shape, with a central longitudinal axis 19 and with a first focal point or focal region F1 that it encircles and a second focal point forward of the said reflector 7. The LED lamp 18 includes a base 1 having means for securing it to a part of the reflector, with the lamp's longitudinal axis 20 aligned with the reflector's longitudinal axis 19 and with the lamp's light emitting diodes 3 being positioned close to the reflector's first focal point F1. A substantial portion of light emitted by the light emitting diodes 3 projects outward 4 in a 360 degree radial pattern 5 around and horizontal to the reflector's longitudinal axis 19 and at a specified angle of radiation 6 vertical to the said reflector's longitudinal axis 19, to impinge on the reflector 7 and be redirected generally forwardly to the second focal point F2 and then through the fresnel lens 13. The forward facing part of the lamp support section 2B may be extended forward and configured as a heat sink cooling device 2B because there are no light emitting diodes facing forwardly mounted to the end of the lamp support 2 section. Additionally an electrical circuit 12 to transform available electrical power into a form to meet the requirements of the said LED lamp 18 may be mounted on the lamp support forward section 2B.

The LED lamp 18 is preferably positioned relative to the reflector 7 with its light emitting diodes 3 as close to the reflector's first general focal point F1 as possible. To the extent that the light emitting diodes 3 are spaced away from that focal point F1, the light projected toward the reflector 7 is more likely not to be reflected and redirected to pass through the fresnel lens 13 and thereby not be incorporated into the projected beam 11. Additionally, to the extent that the light emitting diode's specified angle of radiation 6 is less than 160 degrees, light projected toward the reflector 7 is more likely to be reflected and redirected to pass through the fresnel lens 13 and thereby be incorporated into the projected beam 11. Although the reflector 7 is generally circumferentially symmetrical, its reflective surface is locally irregular, to better integrate the reflected light and thereby provide the projected beam with a more circumferentially-uniform intensity distribution.

In the past, incandescent lamps for this type of light projection system generated light in all directions. Generally, an unduly high proportion of the light emitted by prior lamps was misdirected so as not to be included in the projected beam.

In the LED lamp 18 of the invention, a greater proportion of emitted light is collected into the projected beam 11 by providing the lamp with four light emitting diode arrays 3 wherein one each of the said light emitting diode arrays 3 is mounted to each of the four sides of the lamp support with the specified angle of radiation 6 directionalized outward perpendicular to and spaced substantially symmetrically around, the longitudinal axis 19 of the concave reflector. By this arrangement, a greater proportion of the total emitted light impinges on, and is redirected by, the reflector 7 converging at the second focal point F2 and radiating at substantially the same angle 10 to pass through the fresnel lens 13 and project a high intensity beam of light 11 with an adjustable angle of light projection.

Figure 5:
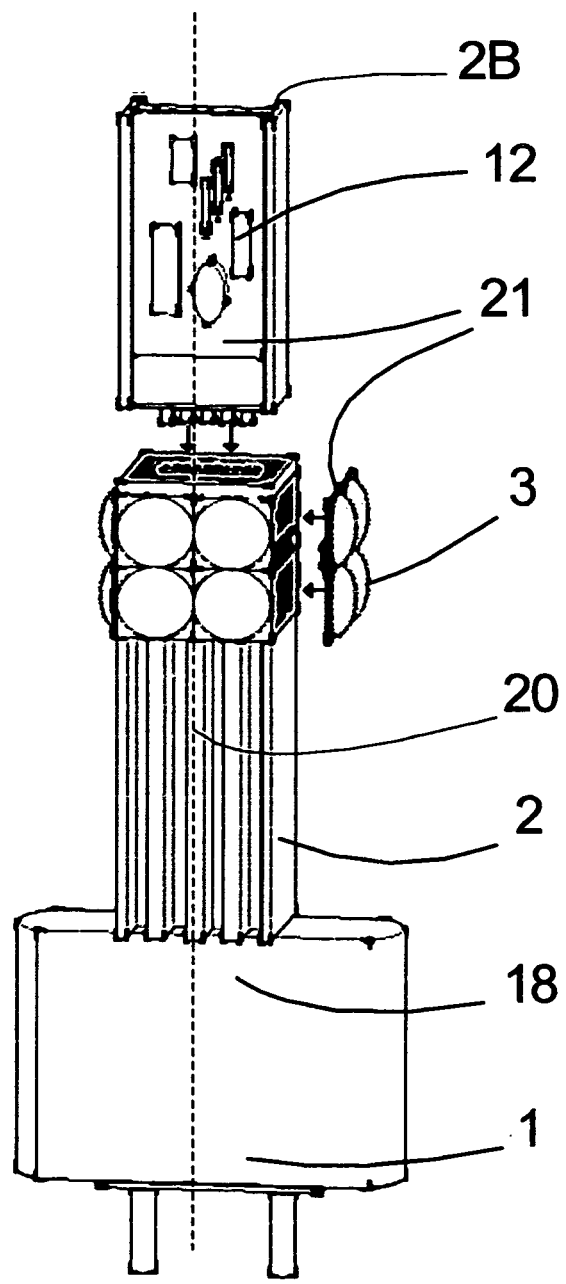
FIG. 5 is a schematic diagram of a dimensional front view of an LED lamp in accordance with the invention, this lamp utilizing directionalized LEDs and an electronic power supply, a heat sink lamp support section including means to easily replace individual components that could fail, and a standard lamp base.

With reference now to FIG. 5, there is shown a front view, with perspective, of an alternate embodiment of an LED lamp 18, constructed in accordance with the invention. In addition to the standard lamp base 1, the lamp further includes a lamp support 2 in the shape of a polygon with a central longitudinal axis 20, a square cross section, and means to receive a forward section 2B including circuit board 21 with an electrical circuit 12 to transform available electrical power into a form to meet the requirements of the said LED lamp 18. The lamp also includes four circuit boards 21, each mounted with four light emitting diode arrays 3 for a total of sixteen light emitting diode arrays 3, each with a specified angle of light radiation 6.

Each of the four sides of the lamp support 2 perpendicular to the longitudinal axis 20 of the said lamp support 2 has means to receive a circuit board 21 that can be easily attached or removed from the lamp to allow for replacement of defective parts or parts that wear out over time. The four circuit boards 21 with four light emitting diode arrays 3 each are mounted substantially perpendicular to the lamp support 2 and spaced symmetrically around the longitudinal axis 20 of the said lamp support 2 to form a compact consolidated light radiation area with a specified length (L), width (W), and height (H), oriented with the height parallel to the longitudinal axis 20 of the said lamp 18.

This configuration closely emulates the size and positioning of a standard incandescent lamp filament wherein the light radiates outward 4 in a 360 degree radial pattern 5 around and horizontal to the longitudinal axis of the lamp but, with the added advantage of, projecting light only at a specified angle of radiation 6 vertical to the longitudinal axis 20 of the said lamp 18. In use, the lamp is advantageously used with its central longitudinal axis 20 aligned with the longitudinal axis 19 of a concave reflector 7.

Because of the lamps' specialized geometry and the vertical specified angle of radiation less than 160 degrees, substantially all of the light radiating from the light emitting diodes is directed toward the concave reflector 7 thereby greatly increasing the efficiency of any illumination system using a concave reflector 7 and this LED lamp 18.

Figure 6:
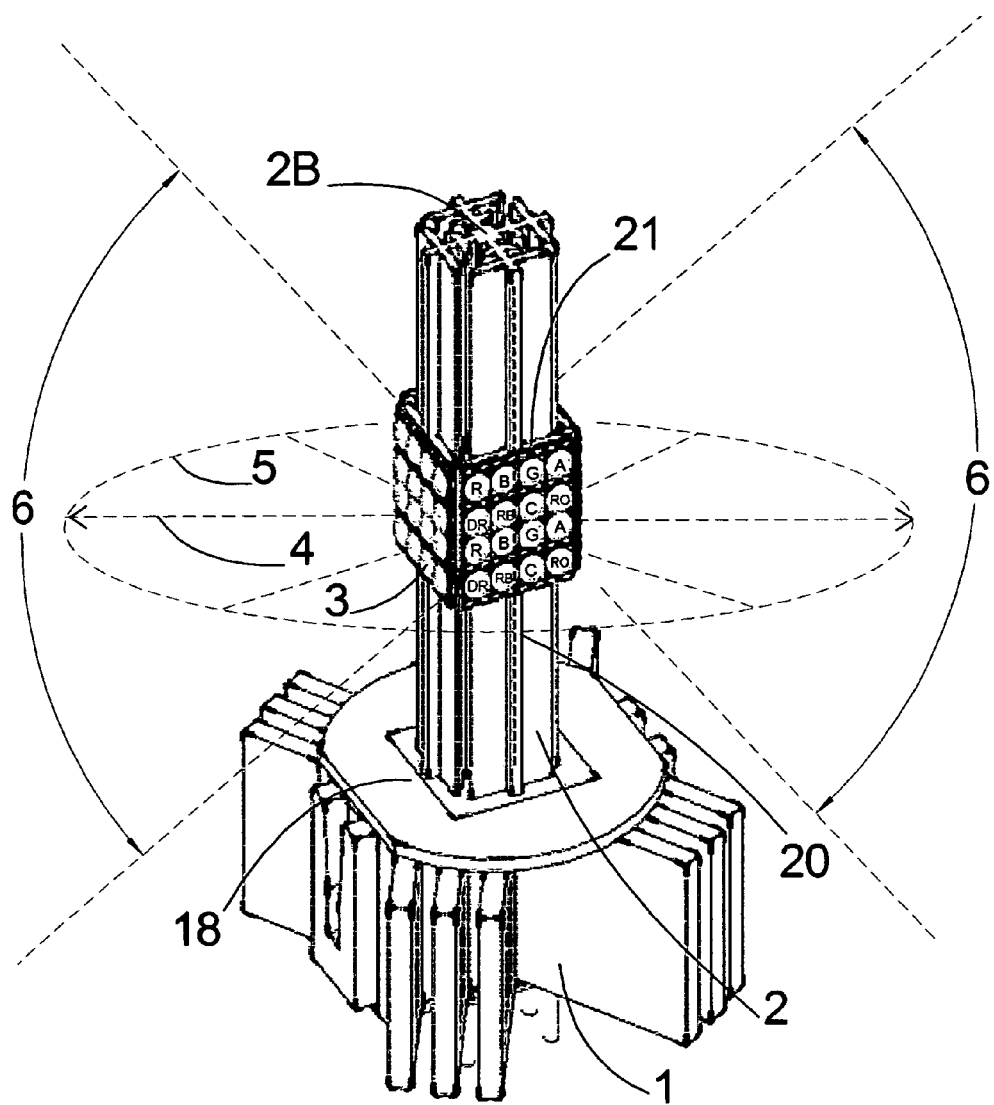
FIG. 6 is a schematic diagram of a dimensional front view of an LED lamp in accordance with the invention, this lamp utilizing sixty four directionalized LEDs of various colors, a rectangular polygon heat sink lamp support section, and a specially designed heat sink lamp base with up to eight individual circuits.

With reference now to FIG. 6, there is shown a front view, with perspective, of an alternate embodiment of an LED lamp 18 constructed in accordance with the invention. The lamp includes a specially designed lamp base 1 providing connection to up to eight electronic circuits and compatible in size to a popular ellipsoidal lighting fixture, the lamp 18 further includes a lamp support 2 in the shape of a polygon with a central longitudinal axis 20 and a generally square cross section. The lamp also includes four circuit boards 21, each mounted with sixteen light emitting diodes 3, with two each producing light of the same color spectrum such as, but not limited to, Red, Blue, Green, Amber, Dark Red, Royal Blue, Cyan, and Red Orange, for a total of sixty four light emitting diodes 3. Each of the four sides of the lamp support 2 perpendicular to the longitudinal axis 20 of the said lamp support 2 has means for providing up to eight electronic circuits and means to receive a circuit board 21 that can be easily attached or removed from the lamp to allow for replacement of defective parts or parts that wear out over time. The four circuit boards 21, each with eight light emitting diodes 3, are mounted substantially perpendicular to the lamp support 2 and spaced symmetrically around the longitudinal axis 20 of the said lamp support 2 to form a compact consolidated light radiation area with a specified length (L), width (W), and height (H), oriented with the height parallel to the longitudinal axis 20 of the said lamp 18.

This configuration closely emulates the size and positioning of a standard incandescent lamp filament wherein the light radiates outward 4 in a 360 degree radial pattern 5 around and horizontal to the longitudinal axis 20 of the lamp 18, but projecting light only at a specified angle of radiation 6 vertical to the longitudinal axis 20 of the said lamp 18. In use, the lamp is advantageously used with its central longitudinal axis 20 aligned with the longitudinal axis 19 of a concave reflector 7.

Because of the lamps' specialized geometry and the vertical specified angle of radiation 6 less than 160 degrees, a substantial portion of the light radiating from the light emitting diodes 3 is directed toward the concave reflector 7 thereby greatly increasing the efficiency of any illumination system using a concave reflector 7 and this LED lamp 18.

Because of the lamps individual circuits allowing connection to as many as eight different groups of LEDs 3, each group producing light of a different color spectrum, remote electronics devices can control the output levels of the individual groups of LEDs 3 which then allows the different colored light to be projected into a reflector 7 where the colors are mixed together to produce a single beam 10 of light capable of projecting virtually any single color desired.

Figure 7:
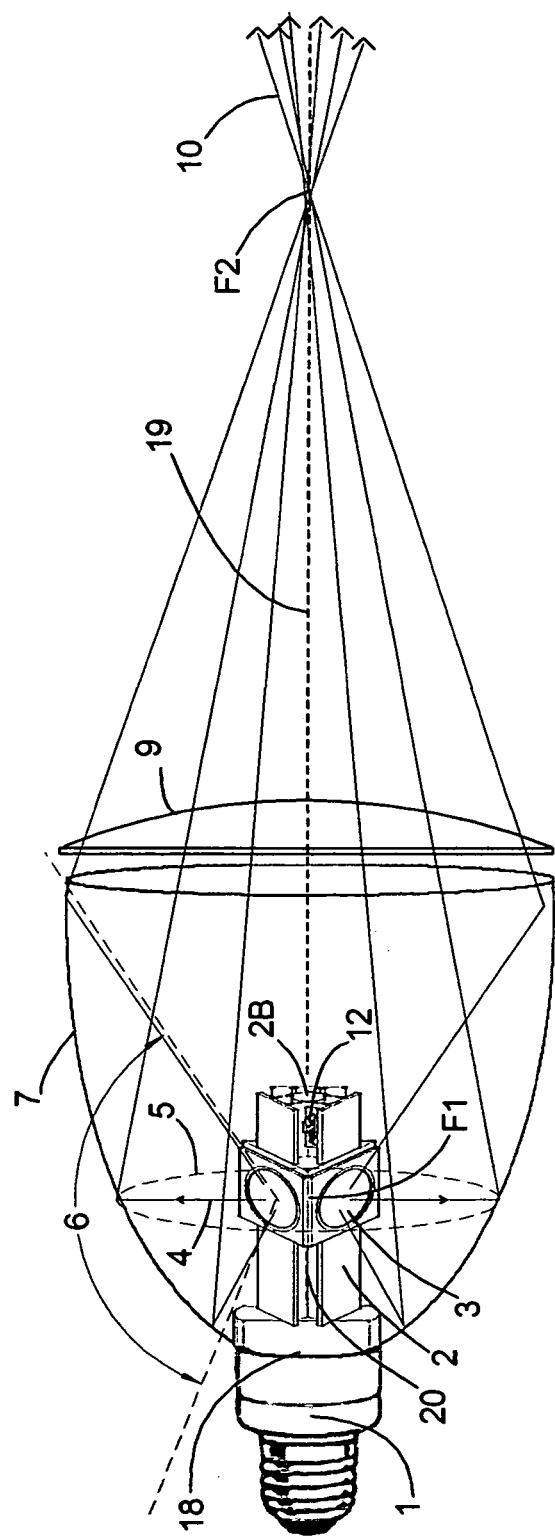
FIG. 7 is a schematic diagram of an alternate embodiment of a reflector lamp illumination system in accordance with the invention, this system including a relfector, three directionalized light emitting diode arrays mounted to a triangular polygon heat sink lamp support section, a circuit to modify the power supplied, a standard medium lamp base, and an optional front lens.
Figure 8A:
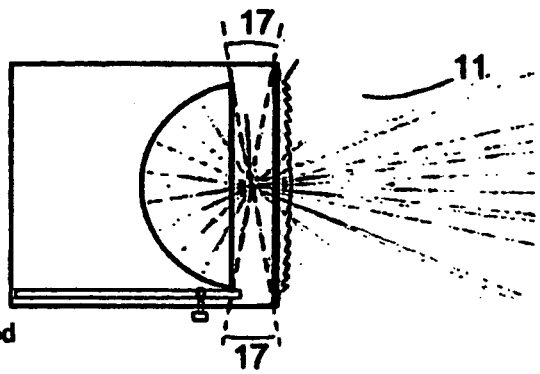
FIGS. 8A and 8B are schematic diagrams of prior art Fresnel light projection fixtures showing the varying amounts of light lost when adjusted to produce a flood or spot light beam, respectively.
Figure 8B:
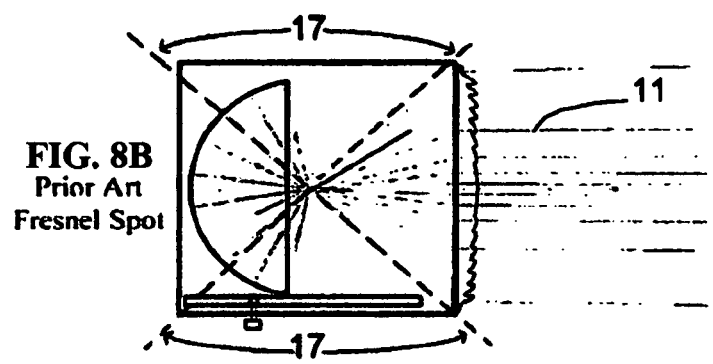
Figure 8C:
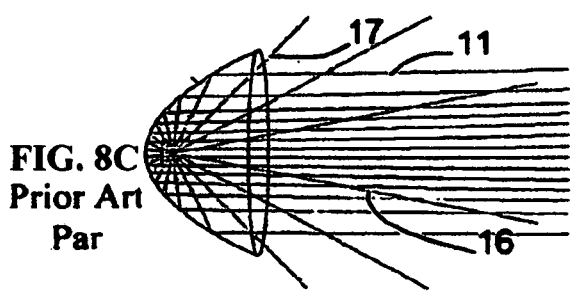
FIG. 8C is schematic diagram of a prior art Par light projection fixture showing light lost and the conflicting angles of light produced when using a standard lamp and a parabolic reflector.
Figure 8D:
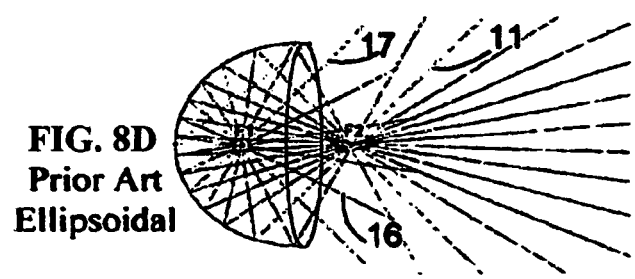
FIG. 8D is schematic diagram of a prior art Ellipsoidal light projection fixture showing light lost and the conflicting angles of light produced when using a standard lamp and an ellipsoidal reflector.

With reference now to the drawings, and particularly to FIG. 7, there is shown schematically an embodiment of a reflector lamp illumination system constructed in accordance with the invention for providing a high-intensity beam of light 10. The system includes an LED lamp 18, a concave reflector 7, and an optional lens 9 to alter the beam's divergence or spread or to integrate the beam and thereby provide a desired intensity distribution.

The reflector is generally ellipsoidal in shape, with a central longitudinal axis 19 and with a focal point or focal region F1 that it encircles. The LED lamp 18 includes a base 1 having means for securing it to a part of the reflector 7, with the lamp's longitudinal axis 20 aligned with the reflector's longitudinal axis 19 and with the LED lamp's light radiation area (L, W, and H) within the "focal region" near the reflector's first focal point F1. The lamp further includes a lamp support 2 in the shape of a polygon with a central longitudinal axis 20 and a triangular cross section. The lamp 18 also includes three light emitting diode arrays 3, each with a specified angle of light radiation 6, and one each of the said light emitting diode arrays 3 mounted substantially perpendicular to each side of the triangular lamp support 2 and spaced symmetrically around the longitudinal axis 20 of the said lamp support 2. Because there are no light emitting diodes mounted to the end of the lamp support section facing forwardly 2B, the lamp support forward section 2B may be extended with an area to support a circuit board 21 with an electrical circuit 12 to transform available electrical power into a form to meet the requirements of the said LED lamp 18 and configured as a heat sink cooling device 2B. A substantial portion of light from the light emitting diodes 3 projects outward 4 in a 360 degree radial pattern 5 around and horizontal to the reflector's longitudinal axis 19 and at a specified angle of radiation 6 vertical to the said reflector's longitudinal axis 19, to impinge on the reflector 7 and be redirected generally forward. By this arrangement, a greater proportion of the total emitted light impinges on the reflector 7 at the proper angle to be redirected, converging at the second focal point F2 and radiating at substantially the same angle 10 to project a high intensity beam of light.

To the extent that the light emitting diode's specified angle of radiation 6 is less than 160 degrees, more of the light projected by the light emitting diodes 3 is likely to impinge on the reflector 7 and thereby be incorporated into the desired projected beam 10. Although the reflector 7 is generally circumferentially symmetrical, its reflective surface can be locally irregular, to better integrate the reflected light and thereby provide the projected beam with a more circumferentially-uniform intensity distribution.

In the past, incandescent lamps in this type of light projection system generated light in all directions. Generally, an unduly high proportion of the light emitted by prior lamps was misdirected so as not to be included in the desired projected beam.

It should be appreciated from the foregoing description that the present invention provides an improved LED lamp 18 that is specially adapted for use in combination with a concave reflector 7 in projecting a smoother, more controlled high-intensity beam of light. In each of several disclosed lamp embodiments, the lamp 18 includes two or more light emitting diodes 3 or light emitting diode arrays 3, each with a specified angle of light radiation 6 directionalized outward 4 perpendicular to and spaced substantially symmetrically around, the longitudinal axis 19 of the concave reflector 7 wherein a substantial portion of the light emitted by the lamp 18 impinges on, and is redirected by, the reflector 7 to project a high intensity beam of light 11 with all light rays radiating at substantially the same angle 10. In addition, the compact consolidated size (L, W, and H) and specified angle of radiation 6 projects light toward the reflector 7 at angles which cause the light to be reflected substantially within the desired beam path, thus providing collection efficiency by maximizing the proportion of light emitted in the direction of the reflector 7 to produce a beam 11 of higher intensity.

Although the invention has been described in detail with reference to the presently preferred embodiments, those of ordinary skill in the art will appreciate that various modifications will be made without departing from the invention.

I claim:

1. An LED lamp comprising:
a base through which electrical power to the lamp is provided; and
a lamp support made to be a heat sink and extends along the longitudinal axis beyond the point where the LEDs are mounted to said lamp support and having a central longitudinal axis extending from said base; and
two or more light emitting diodes or light emitting diode arrays, each with a specified angle of light radiation, mounted substantially perpendicular to the lamp support and spaced symmetrically around the longitudinal axis of said lamp support to form a consolidated light radiation area with a specified length, width, and height oriented with the height parallel to the longitudinal axis of said lamp;
wherein all of the light radiates outward in a 360 degree radial pattern around and horizontal to the longitudinal axis of said lamp support and at a specified angle of radiation vertical to the longitudinal axis of said lamp support and said lamp support is made in two thermally isolated sections with the LEDs mounted to one section and the other section includes an electrical circuit to transform the available electrical power into a form to meet the requirements of the specified said LEDs.

* * * * *